(12) United States Patent
Silver et al.

(10) Patent No.: US 6,174,504 B1
(45) Date of Patent: Jan. 16, 2001

(54) METHODS OF CONTROL OF NITROGEN OXIDE AND HYDROCARBON EMISSIONS FROM SMALL ENGINES

(75) Inventors: Ronald G. Silver, Tulsa; W. Burton Williamson, Broken Arrow, both of OK (US)

(73) Assignee: ASEC Manufacturing, Catoosa, OK (US)

( * ) Notice: Under 35 U.S.C. 154(b), the term of this patent shall be extended for 0 days.

(21) Appl. No.: 08/825,459

(22) Filed: Mar. 28, 1997

Related U.S. Application Data

(63) Continuation-in-part of application No. 08/625,321, filed on Apr. 1, 1996, now abandoned.

(51) Int. Cl.7 .................................................. B01D 53/94
(52) U.S. Cl. ..................................... 423/213.5; 423/239.1; 423/245.3
(58) Field of Search ............................. 423/213.5, 239.1, 423/245.3

(56) References Cited

U.S. PATENT DOCUMENTS

| | | | |
|---|---|---|---|
| 3,840,389 | * 10/1974 | Kobylinski et al. | 117/62 |
| 3,886,260 | * 5/1975 | Unland | 423/213.5 |
| 3,990,995 | * 11/1976 | McArthur | 252/432 |
| 4,087,259 | 5/1978 | Fujitani et al. | 48/212 |
| 4,172,047 | * 10/1979 | Gandhi et al. | 252/466 PT |
| 4,903,482 | * 2/1990 | Overington et al. | 60/301 |
| 4,924,820 | * 5/1990 | Lear et al. | 123/65 PE |
| 4,938,178 | * 7/1990 | Schlunke et al. | 123/65 PE |
| 5,492,880 | * 2/1996 | Zaki et al. | 502/330 |
| 5,548,955 | * 8/1996 | Sandefur et al. | 60/299 |
| 5,597,772 | * 1/1997 | McCabe et al. | 502/332 |
| 5,968,463 | * 10/1999 | Shelef et al. | 423/213.5 |

FOREIGN PATENT DOCUMENTS

| | | | |
|---|---|---|---|
| 23 62 048 | * 6/1964 | (DE) . | |
| 2-102737 | * 4/1990 | (JP) | 423/213.5 |

OTHER PUBLICATIONS

Greenwood et al. *Chemistry of the Elements*, 1st Edition Pergamon Press Elmsford N.Y. USA 10523; ISBN 0–08–022056–8 p. 1292, 1984.*

* cited by examiner

*Primary Examiner*—Steven P. Griffin
*Assistant Examiner*—Timothy C Vanoy
(74) *Attorney, Agent, or Firm*—Vincent A. Cichosz

(57) ABSTRACT

A method of reducing the amounts of nitrogen oxides and hydrocarbons in the exhaust gas from a small, gasoline-fueled utility engine operating fuel-rich, while not reducing the amount of carbon monoxide in said exhaust gas, comprising treatment of said exhaust gas by a catalyst consisting essentially of rhodium supported on an alumina-based washcoat applied to a substrate.

5 Claims, 5 Drawing Sheets

METHODS OF CONTROL OF NITROGEN OXIDE AND HYDROCARBON EMISSIONS FROM SMALL ENGINES

This application is a continuation-in-part of application Ser. No. 08/625,321, filed Apr. 1, 1996, now abandoned.

BACKGROUND OF THE INVENTION

This invention relates to catalysts and methods for removing nitrogen oxides and hydrocarbons from exhaust gas from small utility engines powered by gasoline or gasoline which has been reformulated by the addition of ether or alcohol (hereinafter referred to as "gasoline-fueled"). More specifically, this invention relates to methods for simultaneous removal of hydrocarbons (HC) and nitrogen oxides ($NO_x$) from the exhaust gas of utility engines smaller than about 25 horsepower, with essentially no conversion of CO contained in such gas (i.e., less than about 3% of the CO contained in the exhaust converted to $CO_2$).

"Small utility engines" are generally accepted as being defined by the characteristics used by the CARB (California Air Resources Board) in setting regulatory standards for engine exhaust emissions. Those characteristics recite that "small utility engines" are two-stroke and four-stroke, air or liquid-cooled, gasoline, diesel and alternate fuel powered engines under 25 horsepower (18.6 kW) for powering lawn, garden and turf maintenance implements and timber operations equipment; for generating electricity; and for pumping fluids. They are typically designed to be used in, but not limited to use in, the following applications: walk-behind mowers, riding mowers/lawn tractors, garden tractors, snow blowers, edge trimmers, string trimmers, blowers, vacuums, tillers, chain saws, pumps, and other like miscellaneous applications. See generally, Title 13, Cal. Code of Regulations, Sections 2400–2407 (1995). Those characteristics are intended to be used in defining the term "small utility engines" in connection with this invention.

Regulations are being considered or have already been enacted to limit the exhaust emissions from small utility engines. One of the most promising ways for engine manufacturers to comply with current and future emission standards for small utility engines is through the use of catalysts. Three-way catalysts (catalysts which simultaneously oxidize CO and HC while reducing $NO_x$) are widely used to purify toxic emissions of automotive (i.e., car and truck) internal combustion engines. Small utility engines, however, present an environment with a number of challenges for emission catalyst activity and durability which are not found with automotive exhaust. For example small utility engines typically will provide extremely short catalyst residence times, high hydrocarbon and carbon monoxide to oxygen ratios, overall high levels of emissions leading to high reaction exotherms, perturbated flow due to single cylinder operation, and engine mechanical vibrations.

The differences between automotive and small utility engines pose a set of unique challenges in adapting catalyst technology to this application. In relation to automotive engines, small utility engines tend to have pollutant-rich exhaust, size constraints, extremely high space velocity, high temperature exotherms, a need for improved catalytic and mechanical durability, and cost constraints. The engines for lawn and garden equipment are obviously smaller and less expensive than those found in automobiles, but also have a considerably shorter life expectancy (50 to 250 hrs vs over 3000 hrs for automobile engines). Their duty cycles are also quite different.

Small utility engines are generally made to operate at considerably richer air/fuel ratios than automotive engines in order to prevent overheating of the engine. For this reason and to maintain performance, air/fuel ratios of 11 to 13 are the norm. Moreover, large numbers of small utility engines in use today are made with a side valve combustion chamber and thus tend to have greater internal crevice volumes. These two factors contribute to significantly higher concentrations of hydrocarbons in emissions from such engines than is the case for automotive engines, which are ordinarily designed to operate at or about the stoichiometric point, i.e., an air/fuel ratio of 14.55.

By the nature of their chemistry, catalytic oxidation reactions are exothermic, with the temperature increase across the catalyst bed being directly proportional to the amount of pollutant converted. Because of the high level of pollutants in the exhaust from small utility engines relative to that from automotive engines, the temperature increase generated across a catalytic bed used to treat small utility engine exhaust is much higher than that seen across an automotive converter.

With small utility engines there is also insufficient space available to house and mount the emissions control catalyst in the same manner as is used for automobiles and trucks. The separate canister used for an automotive system is generally not a viable option for a small utility engine. In many cases it has been necessary to house the catalytic element for a small utility engine within the muffler, thereby limiting the size of the catalytic unit to that which can fit within the compact muffler unit. As a result of these limitations, high space velocities across the catalytic element are inherent with small utility engines. Space velocities that are orders of magnitude higher than those encountered by automotive catalytic converters are the norm and thus further serve to limit conversion efficiency. Whereas the space velocity for the catalytic converter of an automotive engine is typically in the order of 40,000 V/H/V and would not exceed 100,000, the space velocity through the catalytic element of a small utility engine contemplated by the present invention is generally about 200,000 at engine idle and much higher (even as high as a million) when the engine is under load.

Clearly, purification of exhausts from small utility engines presents a challenge. Several inventors have proposed methods for addressing the need. Overington et al (U.S. Pat. No. 4,903,482) teaches an exhaust system for 2-stroke engines which includes two exhaust flow paths in parallel, the first of which includes a reduction catalyst and the second of which bypasses the reduction catalyst, the downstream ends of the two flow paths being connected together upstream of an oxidation catalyst.

In similar manner, Schlunke et al (U.S. Pat. No. 4,938,178) teaches an exhaust system for 2-stroke engines which employs separate reducing and oxidizing catalyst portions to treat different portions of the exhaust gas during each exhaust period.

Another approach is taught by Lear et al (U.S. Pat. No. 4,924,820). Lear '820 teaches the use of a plurality of exhaust ports and catalyst chambers, each exhaust port from the engine having a catalyst chamber close-coupled thereon. Lear '820 teaches that the catalyst chamber is effective in decomposing $NO_x$ and in oxidizing hydrocarbons, but employs a mixture of active materials as catalysts.

As is evident from the discussion above, other inventors have relied upon a plurality of catalyst chambers using a plurality of catalysts to reduce harmful emissions from small engines. Discovery of catalysts that would permit the use of one catalyst in a single chamber to reduce emissions from small utility engines, therefore, would clearly be a significant improvement in the state of the art.

Many researchers have taught the use of one catalyst in a single chamber to treat exhaust gas from automotive engines. For instance, Unland (U.S. Pat. No. 3,886,260) teaches the use of a rhodium on alumina catalyst to reduce simultaneously the amounts of nitrogen oxides, hydrocarbons and carbon monoxide contained in exhaust gases from automotive internal combustion engines. McCabe et al (U.S. Pat. No. 5,597,772) teaches a method of preparation of a rhodium on α-alumina catalyst useful as a three-way automotive emissions control catalyst. These teachings, however, relate to automotive engines which do not present the same challenge as is presented by small utility engines.

SUMMARY OF THE INVENTION

The present invention provides methods for reducing nitrogen oxide and hydrocarbon emissions, without simultaneously reducing CO emissions, from gasoline-fueled small utility engines. Under current regulations which limit hydrocarbon and nitrogen oxide emissions, preferential oxidation of hydrocarbons (i.e., reduction in hydrocarbon without concurrent reduction of CO) is desirable. The methods of this invention are particularly effective in reducing nitrogen oxides while simultaneously oxidizing hydrocarbons contained in the exhaust gas from such engines operating "fuel-rich", i.e., below the stoichiometric air to fuel ratio necessary for complete combustion, with no supplemental air added during combustion or afterward.

The methods of the present invention use one catalyst contained in a single catalyst chamber close-coupled to the exhaust port of small utility engines. The catalyst employed in the methods of this invention provides improved HC oxidation under fuel-rich conditions relative to other noble metal combinations, and also selectivity for HC oxidation at the expense of CO and $H_2$ oxidation (i.e. the Rh preferentially oxidizes the HC instead of the CO or hydrogen).

It is well known that Rh is superior to other noble metals in reducing $NO_x$ in the exhaust from internal combustion engines operated under fuel-rich conditions. However, conventional wisdom would suggest that, under the conditions encountered in the exhaust of a small utility engine, the Rh should oxidize the CO and not the HC, while reducing the $NO_x$. The discovery that Rhodium alone is a more effective catalyst for handling small utility engine exhaust because it selectively oxidizes the HC over the CO was unexpected.

DESCRIPTION OF THE INVENTION

Figure 1:
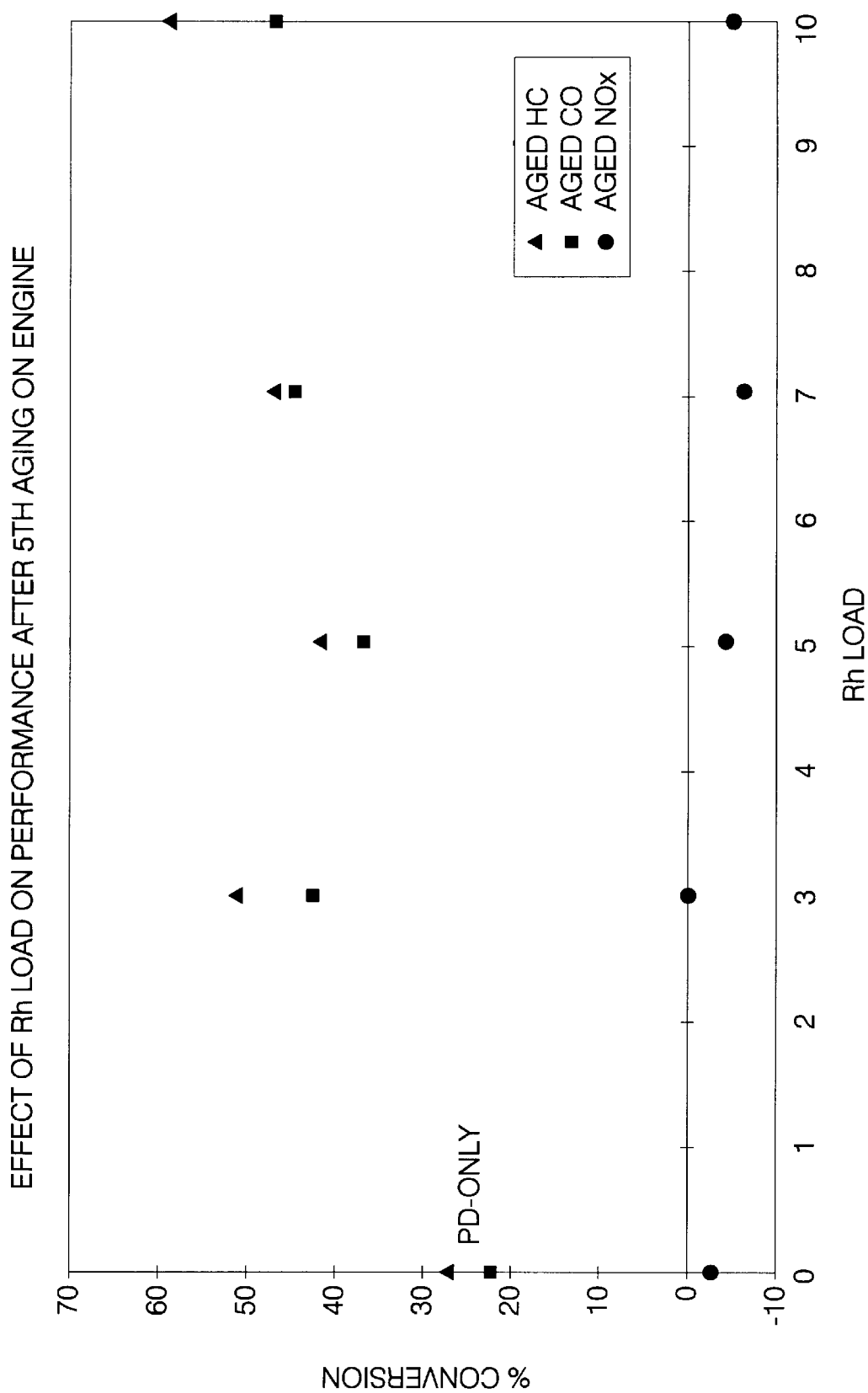
FIG. 1 shows the effects of Rh load (gm. $Rh/ft.^3$ of substrate) on catalyst performance for a gasoline-fueled, side valve small utility engine treated according to the present invention following 5 hours of catalyst aging on the engine under SAE standard aging conditions.

We have discovered that, contrary to conventional wisdom, catalysts in which the catalytically active material consists only of rhodium supported on alumina-based supports are uniquely effective in selectively oxidizing hydrocarbons contained in the exhaust gas from small utility internal combustion engines. It has been determined that the unique results according to the present invention are most noticeable when the supported rhodium is applied in a washcoat on any suitable inert carrier/substrate at rhodium concentrations above about 1 $gm/ft.^3$ on the finished carrier. Concentrations of rhodium that result in the finished monoliths having greater than 3 gm. $Rh/ft.^3$ are preferred, and concentrations of between about 6.5 and 7.0 gm. $Rh/ft.^3$ are most preferred. Concentrations above about 8.0 $gm/ft.^3$ appear to produce little, if any, additional benefit.

The choice of the carrier/substrate on which the supported catalytically active materials are deposited does not appear critical to the methods of this invention. Any inert carrier structure suitable for having an alumina-based washcoat applied thereto and adapted to treat the emissions from small utility engines should be effective. However, test results have indicated that cordierite honeycomb monoliths give better conversion results than typical foam-type carrier/substrates and, for this reason, are preferred. Most preferred are cordierite monoliths having 400 $cell/in.^2$ (cpi) available surface area, such as those available from Corning.

We have discovered that an effective method for controlling emissions from small utility engines according to the present invention includes installing the carrier substrate containing the Rh-only catalytically active material in a single catalyst chamber, said chamber being close-coupled to the exhaust port of the engine in a manner such that all the exhaust gas from the engine passes directly through the catalyst chamber prior to being exhausted to the atmosphere. By "close coupled" we mean that the distance from the inlet end of the catalyst chamber to the exhaust port of the engine (i.e., the engine's outlet valve) should be no more than about 8 cm. This is due to the need to have the exhaust gas exit the engine without indirectly exposing the operator to the high temperature of the gas. Of course, practical considerations will usually prevent the catalyst chamber from being mounted closer than about 1 cm. from the engine outlet.

We have found that the method of the present invention is more effective at reducing hydrocarbon emissions when a sufficient amount of the preferred catalyst (i.e., from about 3 to about 8 gm. $Rh/ft.^3$ deposited using an alumina washcoat on 400 cpi cordierite) is used such that the catalyst volume employed in the chamber is sufficient to provide a ratio of engine displacement to catalyst volume less than about 2.5, with a ratio of 1.5 or less being preferred. When the ratio of engine displacement to catalyst volume is greater than about 2.5, there is not enough catalyst present to attain the maximum possible hydrocarbon conversion (i.e., that conversion determined by oxygen availability in the exhaust gas).

Catalyst Preparation

The catalyst compositions useful in this invention may be made by methods known to those skilled in the art. The composition of washcoat material used to support the rhodium preferably includes those that are alumina-based, that is, in which the characteristic defining constituent is a higher order and/or chemically-stabilized alumina. In one preferred preparative method, the support (e.g. γ-alumina) for the active component is reduced, as by milling, to provide particles of a suitable size (usually between about 1 μm to 50 μm) and then dried at a temperature of about 100 to 600° C. to produce a powder suitable for washcoating a relatively non-porous substrate. The powder is then slurried in water or some other suitable liquid and the carrier/substrate immersed, sprayed, or otherwise covered with the slurry.

The carrier/substrate will preferably be a monolith of the type well known to those skilled in this art. Although not preferred, non-porous pellets can also be coated or impregnated with the support washcoat. After drying, the support-coated substrate is ready to receive the active metal, which in this invention consists essentially of rhodium. Supplemental amounts of other catalytically active materials may be included as long as the advantages of the invention are retained.

The rhodium is typically applied to the support by decomposing a rhodium compound which has been deposited on the support. Examples of rhodium compounds include: rhodium chloride, rhodium nitrate, rhodium hexamine chloride, rhodium-sulfite acid, rhodium acetate, and other rhodium compounds which can be deposited on the support. Typically, the noble metal is in a liquid solution which can be used to impregnate the support by techniques familiar to those skilled in the art.

Alternatively, the support may be impregnated or otherwise have the active rhodium metal directly deposited therein before the slurry is made and the substrate coated.

Catalyst Performance

A major discovery of the inventors is that the use of Rh alone, without the addition of other noble metals, is more effective at simultaneously oxidizing hydrocarbons and reducing $NO_x$ in the exhaust gas from small utility engines than the use of Pd, Pd/Rh mixtures, and other noble metals and mixtures thereof. This discovery of improved hydrocarbon oxidation under these conditions relative to other noble metals was unexpected.

Another discovery is that the catalysts of the present invention exhibit a high selectivity towards the oxidation of HC relative to CO and appear to have little or no effect on CO when applied to the exhaust gas from small utility engines operated "rich" (i.e., operated at air/fuel ratios less than about 14.55, the stoichiometric air/fuel ratio). This discovery was also unexpected.

Finally, the inventors have determined that the performance of the catalysts of the present invention are affected by the carrier/substrate to which they are applied. Catalysts applied to cordierite honeycomb monoliths are more effective in reducing harmful emissions from small utility engines than the same catalysts applied to SiC foams of varying porosity.

The following examples provide illustration of these discoveries.

EXAMPLE 1

Comparative

A series of catalysts was prepared to demonstrate the superiority in reducing harmful emissions of the catalysts of the present invention over a similar catalyst embodiment using Pd-only instead of Rh-only as the noble metal.

Five catalyst samples were prepared by the method specified above, resulting in the formulations listed in Table 1.

TABLE 1

Catalyst Descriptions

| Noble Metal | Loading | Substrate |
|---|---|---|
| Pd | 100 gm/ft.$^3$ | 400 cpi cordierite monolith |
| Rh | 3 gm./ft.$^3$ | 400 cpi cordierite monolith |
| Rh | 6.7 gm./ft.$^3$ | 400 cpi cordierite monolith |
| Rh | 10 gm./ft.$^3$ | 400 cpi cordierite monolith |
| Rh | 5 gm./ft.$^3$ | Selee foam |

All samples were aged five hours by exposure to the entire exhaust gas stream from a Tecumseh TVS 90 engine according to the following protocol:

1 hour with engine operating at 75% load 1 hour with engine operating at 100% load Cool down 1 hour with engine operating at 75% load 2 hours with engine operating at 100% load The samples were then tested for effectiveness in catalyzing the reduction in harmful emissions by exposing them to the exhaust gas from the same engine according to the SAE J1088 procedure, shown in Table 2.

TABLE 2

SAE J1088 Mode Descriptions

| Mode | Throttle | Speed | Load |
|---|---|---|---|
| 1 | Closed | Idle | Minimum |
| 3 | Full | 85% of rated | 100% |
| 4 | Part | 85% of rated | 75% |
| 5 | Part | 85% of rated | 50% |
| 6 | Part | 85% of rated | 25% |
| 7 | Part | 85% of rated | 10% |

FIG. 1 shows the average results from the engine tests for each sample after aging the sample 5 hours. At least two and up to four tests were run on each formulation, with a new sample employed every other test (i.e., two tests run on each sample). The data shown at Rh load=0 represent performance of the Pd-only reference catalyst; the data shown at Rh load=5 represents performance of the 5 gm. Rh/ft.$^3$ catalyst on Selee foam substrate.

The results in FIG. 1 show that the catalysts of the present invention are superior to the Pd-only reference catalyst in converting HC and $NO_x$. FIG. 1 also shows that above a minimum effective Rh loading, believed to be about 1 gm. Rh/ft.$^3$ of substrate, catalyst performance is indifferent to Rh loading. In addition, there is an indication that the selection of substrate has an effect on catalyst performance. (This effect is discussed further in Example 3.)

FIG. 1 also indicates CO conversion was at best non-existent, and in some cases an increase in CO across the catalyst chamber is shown as a negative conversion. This negative conversion of CO is due to incomplete HC oxidation. This selectivity of the catalysts to HC oxidation is evident in all circumstances where the catalyst is applied to the exhaust gas from engines running fuel-rich.

Figure 2:
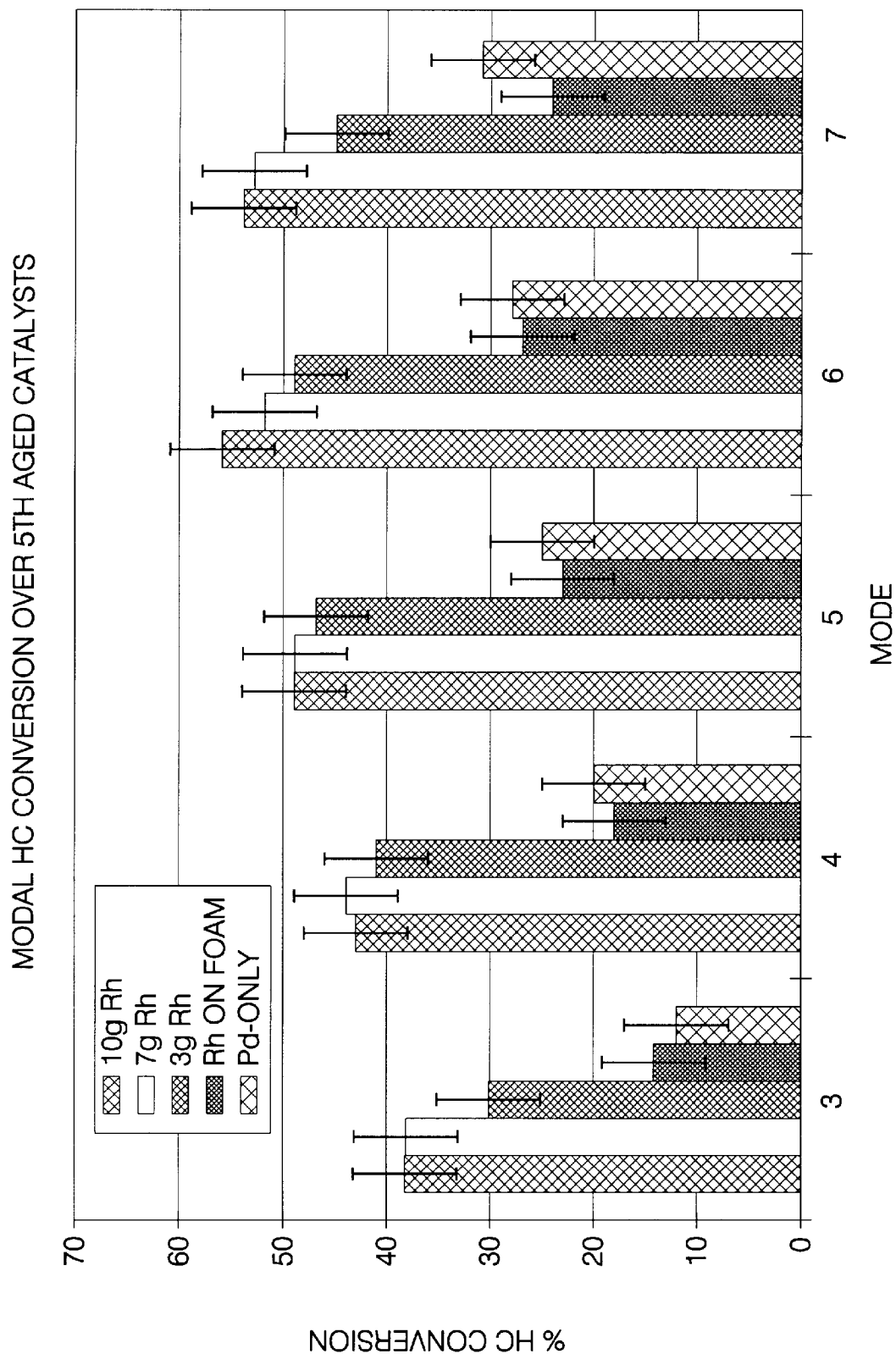
FIG. 2 shows the SAE J1088 modal conversion results for HC in the exhaust gas from a gasoline-fueled small utility engine running fuel-rich. All catalysts were aged five hours before the tests were run. The modes shown illustrate the effect of increasing available Rhodium on a single cordierite honeycomb monolith substrate and compare the use of a SiC foam substrate with the preferred cordierite substrate in the methods of the present invention. As in FIG. 1, the results obtained with the same engine using a comparable Pd-only catalyst are also shown.

FIG. 2 shows the variations in HC conversion from mode to mode of the J1088 procedure over all catalyst samples. These data show that HC conversion is independent of Rh loading on a honeycomb substrate. The data also show that catalysts consisting of Rh on a honeycomb substrate are superior to Pd catalysts and to Rh-on-foam-substrate catalysts under all engine operating modes.

Figure 3:
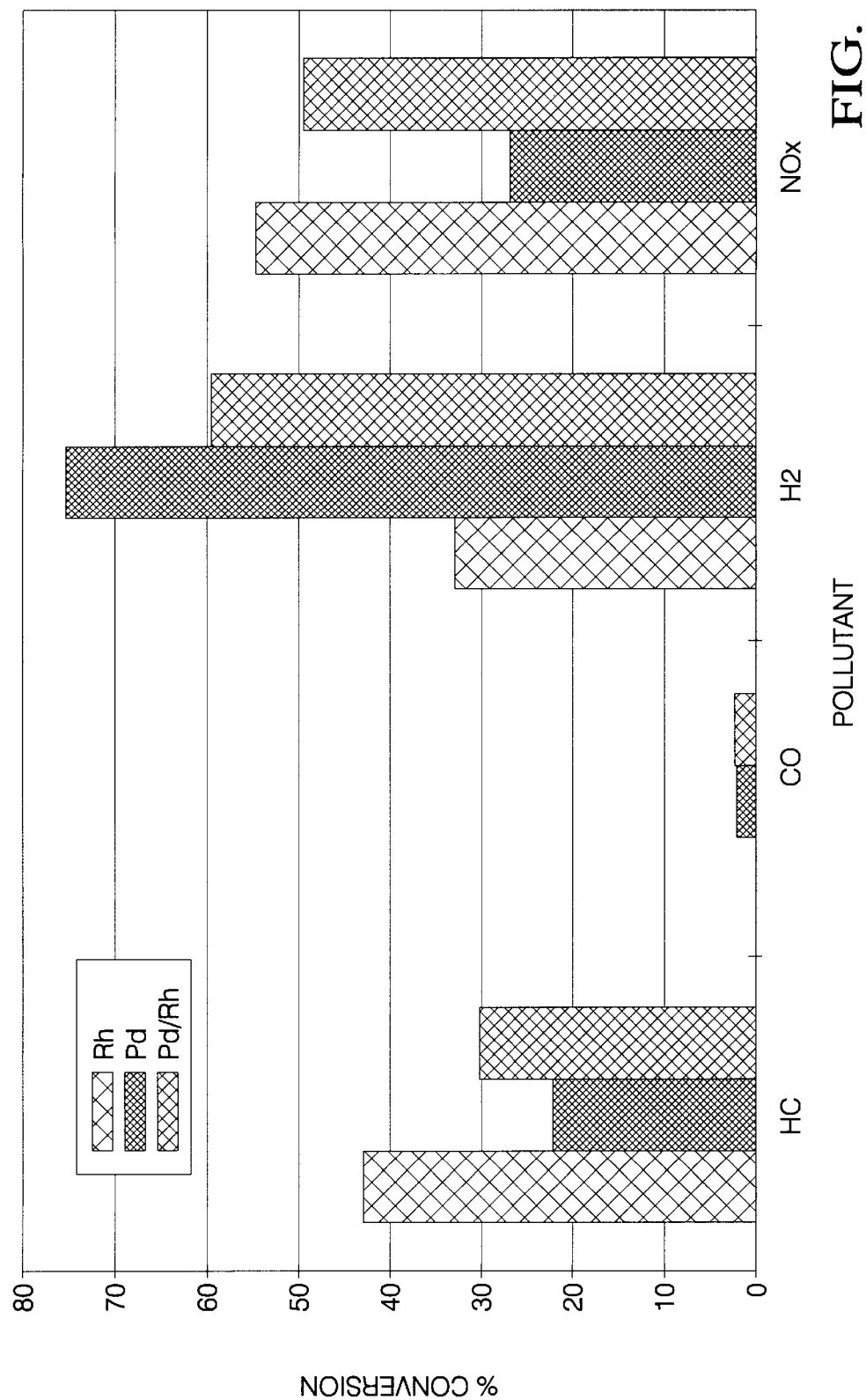
FIG. 3 compares the overall weighted conversion performance of the Rhodium catalysts of the present invention with analogous palladium and palladium/rhodium catalysts employed in the same manner.

FIG. 3 compares the performance of the rhodium catalyst of the present invention with palladium and palladium/rhodium catalysts, and shows that the Rh-only catalyst is favored for hydrocarbon and nitrogen oxide conversion.

Figure 4:
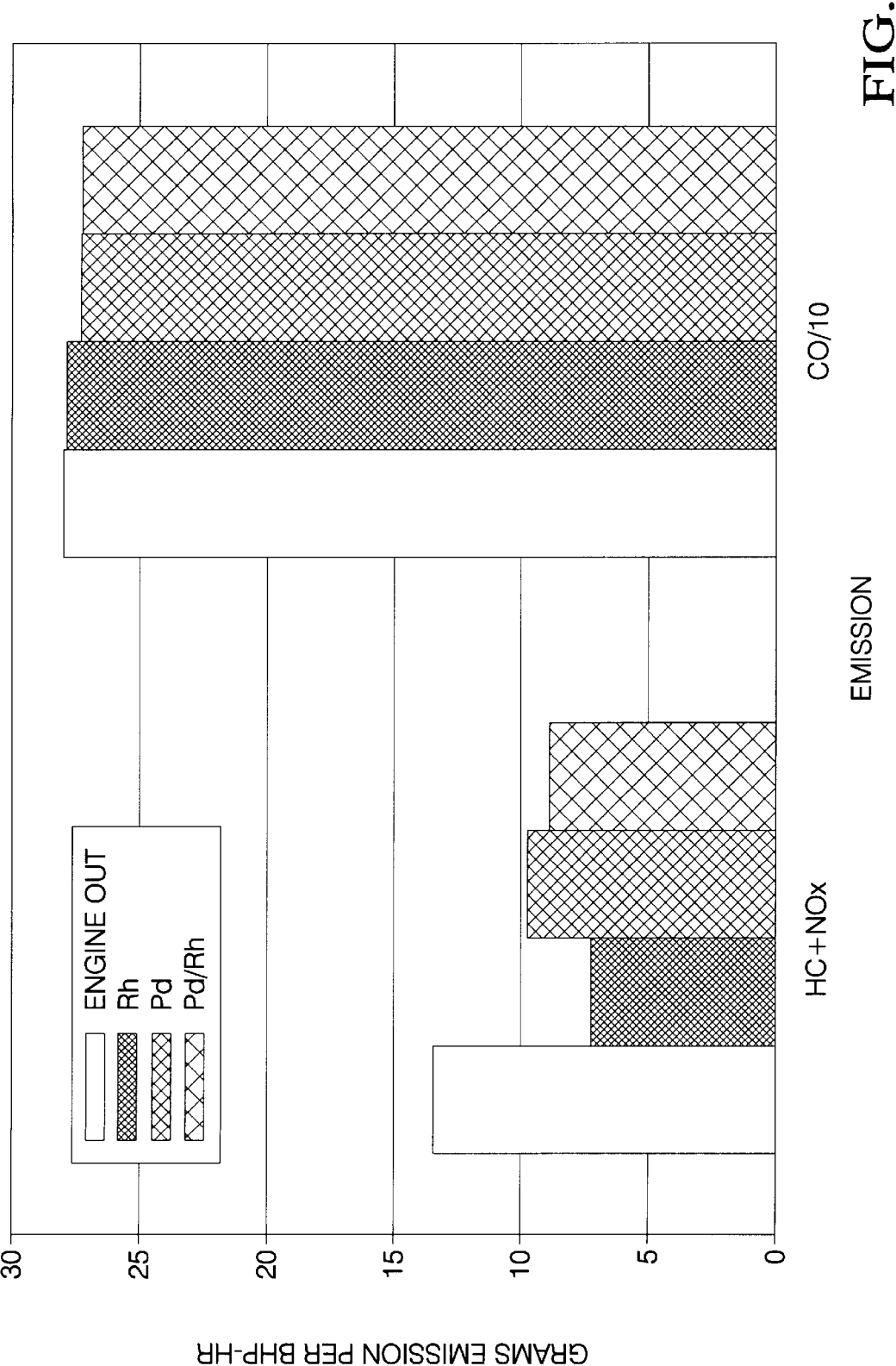
FIG. 4 shows overall weighted emissions from each of the engines tested in FIG. 3 as compared to engine-out (untreated) emissions from the same engines.

FIG. 4 shows overall weighted emissions from each catalyst in FIG. 3, as well as from engine out emissions. On this figure reductions in emissions are indicated by bars lower than the corresponding engine-out bars. CO emissions have been divided by a factor of 10 in order to fit on the graph.

Figure 5:
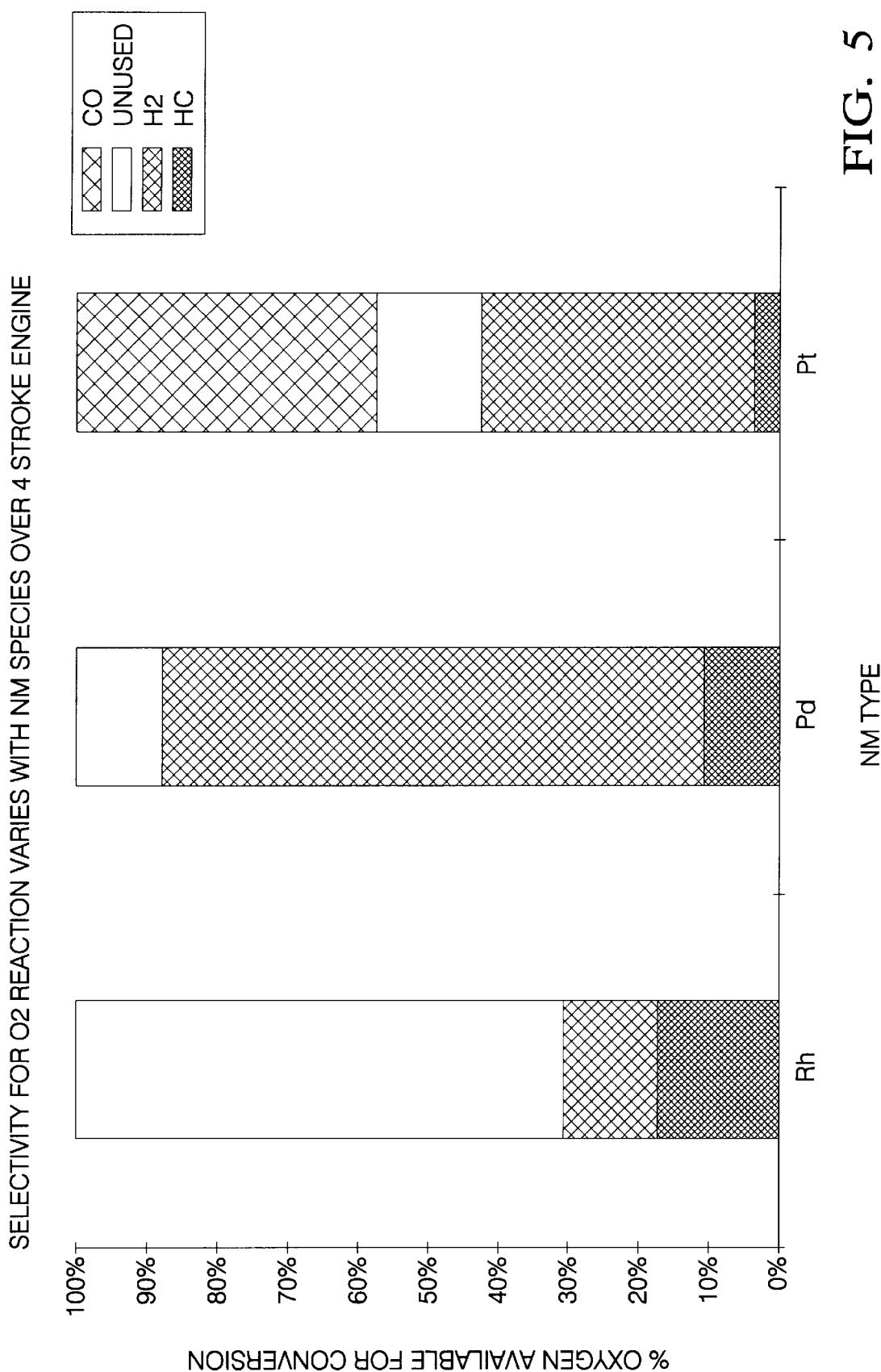
FIG. 5 compares available oxygen consumption modes over different catalyst species employed to treat the emissions from a gasoline-fueled, 4 stroke small utility engine according to the parameters of the methods of the present invention.

FIG. 5 shows how the available oxygen is used over different catalysts. For Rh, most of the available oxygen is used to convert hydrocarbon, some used to convert hydrogen, and the remainder unused.

EXAMPLE 2

This example shows the effect of substrate type on performance of the catalysts of the present invention and demonstrates their high selectivity for hydrocarbon conversion as compared to CO conversion.

Samples of the catalyst were prepared as specified above and deposited on three different substrates: a 400 cell/in.$^2$ (cpi) cordierite honeycomb, a 10 pore/linear inch (ppi) SiC foam and a 25 ppi SiC foam. All parts contained 6.7 gm. Rh/ft.$^3$ of substrate and were made at the same time with the same washcoat and noble metal passes to ensure that the only differences between samples were due to the different substrates.

The finished parts were aged 5 hours using the procedure described in Example 1 and then tested according to the same SAE J1088 procedure described in Example 1 using exhaust from the Tecumseh TVS 90 engine operating at rich conditions. Two samples of each formulation were tested.

Table 3 shows the average catalyst conversion results for the three samples.

TABLE 3

| | Substrate Type | | |
|---|---|---|---|
| | 400 cpi honeycomb | 25 ppi foam | 10 ppi foam |
| % HC Conversion | 41 | 23 | 18 |
| % CO Conversion | −7 | −5 | −3 |
| % NO$_x$ Conversion | 71 | 54 | 43 |

It is evident that HC and NO$_x$ conversions are superior for those samples employing the cordierite honeycomb substrate to that achieved with either of the foam substrates. CO conversion is virtually non-existent for all three samples, thus indicating exceptional selectivity for hydrocarbon conversion with the available oxygen regardless of the support material.

What is claimed is:

1. A method of reducing the amounts of nitrogen oxides and hydrocarbons in the exhaust gas from small utility engines that are gasoline-fueled and adapted to operate fuel-rich, comprising contacting said exhaust gas with a catalyst consisting essentially of a catalytically effective amount of Rh supported on an alumina-based washcoat on a carrier, said catalyst being contained in a catalyst chamber having an inlet end located no further than about 8 cm. from the exhaust port of said engine, without substantial oxidation of carbon monoxide in said exhaust gas.

2. The method of claim 1 wherein the amount of catalyst is such that the ratio of said engine's piston cylinder volume to catalyst volume is less than about 2.5.

3. The method of claim 2 wherein the Rh concentration in the catalyst is between about 1.0 and about 8.0 grams/ft$^3$ of carrier.

4. The method of claim 2 wherein the Rh concentration in the catalyst is between about 3.0 and about 7.0 grams/ft$^3$ of carrier.

5. The method of claim 1 wherein the carrier is a cordierite honeycomb monolith.

\* \* \* \* \*